United States Patent
Srinivasaraghavan et al.

(10) Patent No.: US 8,812,961 B2
(45) Date of Patent: Aug. 19, 2014

(54) DYNAMIC COLLABORATIVE TECHNIQUES

(75) Inventors: Haripriya Srinivasaraghavan, Bangalore (IN); Scott Alan Isaacson, Woodland Hills, UT (US)

(73) Assignee: Novell, Inc., Provo, UT (US)

( * ) Notice: Subject to any disclaimer, the term of this patent is extended or adjusted under 35 U.S.C. 154(b) by 467 days.

(21) Appl. No.: 12/472,537

(22) Filed: May 27, 2009

(65) Prior Publication Data

US 2010/0306676 A1    Dec. 2, 2010

(51) Int. Cl.
G06F 3/048    (2013.01)
G06F 15/16    (2006.01)

(52) U.S. Cl.
USPC ............ 715/758; 715/753; 709/204; 709/227

(58) Field of Classification Search
CPC .... H04L 12/1813; G06Q 10/10; G06F 3/048; G06F 15/16
USPC .................................. 715/758, 751; 707/608
See application file for complete search history.

(56) References Cited

U.S. PATENT DOCUMENTS

| | | |
|---|---|---|
| 6,963,334 B1 | 11/2005 | Stevens et al. |
| 7,219,233 B1 | 5/2007 | Hendriks et al. |
| 7,426,297 B2 | 9/2008 | Zhang et al. |
| 7,450,109 B2 | 11/2008 | Halcrow et al. |
| 2002/0065848 A1* | 5/2002 | Walker et al. .................. 707/511 |
| 2002/0113773 A1 | 8/2002 | McDonnell et al. |
| 2003/0088623 A1* | 5/2003 | Kusuda ......................... 709/204 |
| 2004/0070616 A1 | 4/2004 | Hildebrandt et al. |
| 2005/0149621 A1* | 7/2005 | Kirkland et al. .............. 709/207 |
| 2006/0090137 A1* | 4/2006 | Cheng et al. .................. 715/758 |
| 2006/0119584 A1 | 6/2006 | Lai et al. |
| 2006/0149567 A1* | 7/2006 | Muller et al. ...................... 705/1 |
| 2010/0241749 A1* | 9/2010 | Rasmussen et al. .......... 709/226 |

OTHER PUBLICATIONS

"WhiteBoardMeeting", http://en.wikipedia.org/wiki/WhiteBoardMeeting, From Wikipedia, the free encyclopedia, (Feb. 20, 2009).

Hanson, Mark, et al., "Multi-user document editing system and method", http://www.faqs.org/patents/app/20090006946, (2006).

* cited by examiner

*Primary Examiner* — William Bashore
*Assistant Examiner* — Jeanette J Parker
(74) *Attorney, Agent, or Firm* — Schwegman, Lundberg & Woessner, P.A.

(57) ABSTRACT

Techniques for dynamic collaboration are provided. A main collaboration session having multiple interacting parties proceeds in a sequential and linear fashion. An element of the main collaboration session, where the element is not a last or most recent element of the main collaboration session, is acted upon and a sub communication session is initiated. The main collaboration session and the sub communication session proceed independent of one another but remained linked and can be later re-integrated with one another.

10 Claims, 9 Drawing Sheets

DYNAMIC COLLABORATIVE TECHNIQUES

BACKGROUND

Online communication is becoming increasingly pervasive in the connected world economy. Business collaboration has emerged as a mechanism for businesses to increase revenues and decrease expenditures. Furthermore, social collaboration is everywhere with the proliferation of social networking sites on the Internet and the World-Wide Web (WWW).

Automated chatting applications and Internet whiteboards have thus far functioned in a linear fashion or in a two-dimensional space. For example, when a user chats with another user online it is a linear communication; similar to a series of electronic mail (email) exchanges between the two users involved in the chat. Chat applications are basically modeled along the lines of a phone conversation; in other words a sequential exchange, where one does not expect an existing conversation to branch off at specific points in time and/or later reconcile at a different point in time to continue that previous conversation.

The problem is that a user wants to be able to pinpoint an actual message belonging to a specific conversation for which he/she is responding. To ensure that a message is assigned to a specific conversation, most software applications and services provide the typical sequential feature/function similar to existing phone technology. But unlike a voice call, users today frequently multitask over the Internet where they are actively involved in many online chats or communications with multiple parties and with multiple threads within a single conversation with a single party. The current and conventional chat user interface (UI) and chat structuring technologies are not conducive to this type of dynamic multitasking and multi-threaded interaction that the Internet provides and that individuals engage in during normal activities associated with today's highly-connected world.

Similar problems exist in other collaboration tools. For example, an online white-board or collaborative workspace normally is very static in nature, and allows one person to lock it and work at the online board one person at a time. But, what is actually real world activity is a board where a person can have everyone working simultaneously on different parts of the same board, and even correct one another on the board. This is what occurs in a real world brainstorming session of an enterprise with multiple participants in attendance. In such a real world meeting there may also be sub groupings of people that pair up in areas of the room to work on subsections of the overall board. This sub group activity can occur simultaneously within the room with other sub group activities and with the overall discussion of the topics on the board continuing unabated. However, these described features/functions of real world activity are not feasible with existing collaboration technologies that exist today in the industry.

In still another problem occurs with document processing, where one expects a single person to author or write to a document at a time; today, there is no easy way to divide up that document and work on it simultaneously. Moreover, correcting information online in another person's subsection of the document is difficult to achieve with existing approaches.

Thus, improved techniques for online collaboration are needed.

SUMMARY

In various embodiments, techniques for dynamic online collaboration are provided. More specifically, and in an embodiment, a method is provided for online collaboration. A communication session, which is occurring in a time-based and sequential order, is maintained. A selection of an element within the communication session is identified. The selected element occurs before a most recent element of the communication session, which is provided in the sequential order. Next, a sub communication session is generated. The sub communication session begins with the selected element and is maintained independent of the communication session. Furthermore, the sub communication session is linked back to and has a relationship with the communication session.

DETAILED DESCRIPTION

A "resource" includes a user, content, a processing device, a node, a service, an application, a system, a directory, a data store, a text message, a chat message, a document, an online interactive whiteboard, groups of users, combinations of these things, etc. Resources can interact with each other and can either act on other resource or be acted upon by other resources. The term "service" and "application" may be used interchangeably herein and refer to a type of software resource that includes instructions, which when executed by a machine performs operations that change the state of the machine and that may produce output. Additionally, the term "element" may be used synonymously with the term "resource."

A resource is recognized via an "identity." An identity is authenticated via various techniques (e.g., challenge and response interaction, cookies, assertions, etc.) that use various identifying information (e.g., identifiers with passwords, biometric data, hardware specific data, digital certificates, digital signatures, etc.). A "true identity" is one that is unique to a resource across any context that the resource may engage in over a network (e.g., Internet, Intranet, etc.). However, each resource may have and manage a variety of identities, where each of these identities may only be unique within a given context (given service interaction, given processing environment, given virtual processing environment, etc.).

The term "session" refers to an online interactive, dynamic, and real time set of communications between one or more resources, such as users. A session can be an interactive online meeting, a chat session, and editing or reviewing session of a document, and other situations where more than one resource gets together online to corroborate in some manner.

A "party" is s type of resource that interacts during a session, such as a user. Although, in some embodiments a party can be an automated service that acts on behalf of a user or even acts independent of any user during a session.

Various embodiments of this invention can be implemented in existing network architectures, chat sessions, user interfaces, security systems, data centers, and/or communication devices. For example, in some embodiments, the techniques presented herein are implemented in whole or in part in the Novell® network, proxy server products, email products, operating system products, data center products, and/or directory services products distributed by Novell®, Inc., of Provo, Utah.

Of course, the embodiments of the invention can be implemented in a variety of architectural platforms, operating and server systems, devices, systems, or applications. Any particular architectural layout or implementation presented herein is provided for purposes of illustration and comprehension only and is not intended to limit aspects of the invention.

It is within this context, that various embodiments of the invention are now presented with reference to the FIGS. 1-4.

Figure 1:
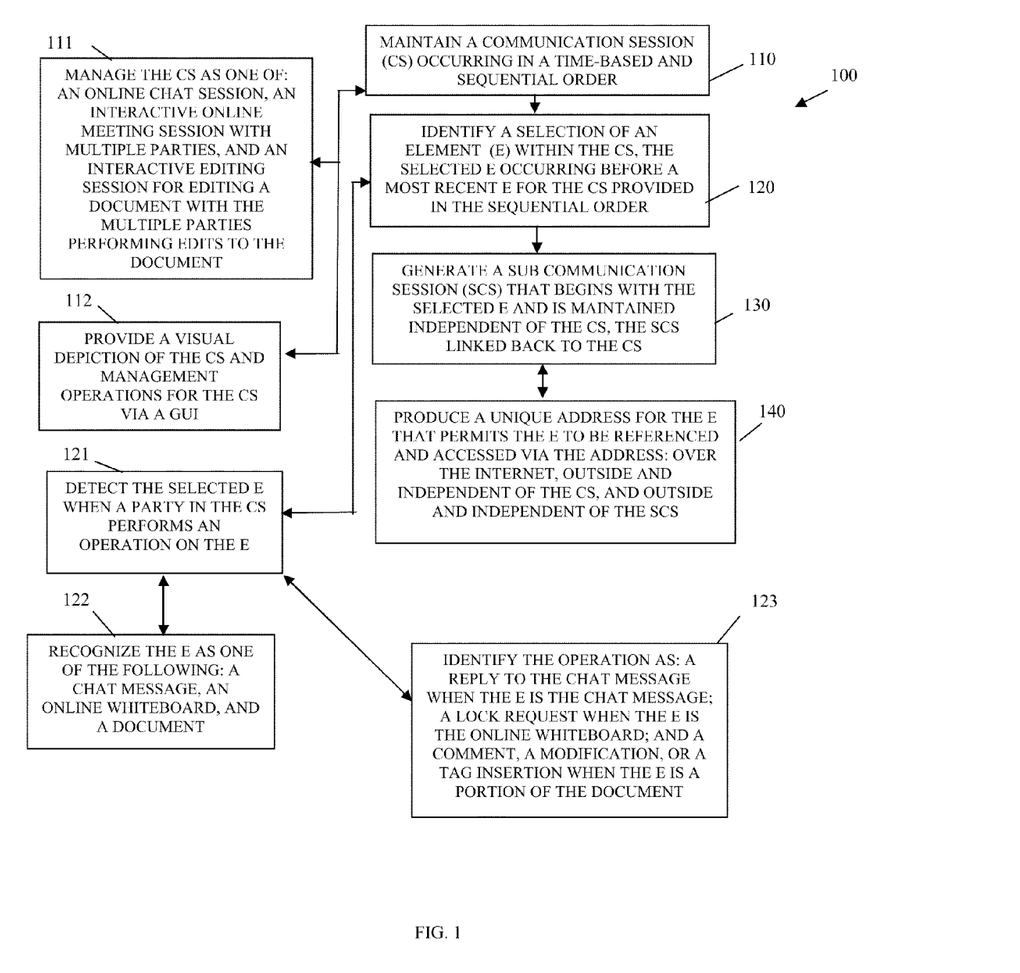
FIG. 1 is a diagram of a method for dynamic online collaboration, according to an example embodiment.

FIG. 1 is a diagram of a method 100 for dynamic online collaboration, according to an example embodiment. The method 100 (hereinafter "collaboration service") is implemented as instructions in a machine-accessible and computer-readable storage medium. The instructions reside in a machine and are executed by the machine (computer, processor, or processor-enabled device) perform the processing depicted in FIG. 1. The collaboration service is also operational over and processes within a network. The network may be wired, wireless, or a combination of wired and wireless.

Each of the processing activities discussed within the context of the FIG. 1 are executed on one or more processors that are accessible over the network. In an embodiment, the network is the Internet.

At 110, the collaboration service maintains a communication session that is occurring in a time-based and sequential order. That is, a main communication session is being maintained or is already established and is being actively monitored in a dynamic and automated fashion by the collaboration service.

In an embodiment, at 111, the collaboration service manages the communication session as an online chat session, an interactive online meeting session with multiple parties, or an interactive editing session for editing a document with multiple parties performing edits to the document.

According to an embodiment, at 112, the collaboration service provides a visual depiction of the communication session and management operations for the communication session via a Graphical user Interface (GUI). So, the communication session may be depicted via a series of messages, edits, etc. to multiple parties participating in the communication session. In some cases, the visual depiction is a tree showing relationships between the parties participating in the communication session.

At 120, the collaboration service identifies a selection of an element within the communication session provided in the sequential order. The selected element occurs or is selected in a non linear fashion within the communication session. So, the selected element may occur before a last, before a most recent, or before a most current element for the communication session. For example, consider a communication session associated with a chat or text message dialogue, where one party X sends 5 messages to party Y. Y then selects message 3 to respond to rather than just responding to message 5, which is the last one or the most current text message. X may want to respond to message 3 independent of the other messages for any number of reasons. Message 3 may be entirely unrelated to the other messages; message 4 may not make sense until message 3 is answered; etc. This permits a user to branch off on a new conversation or communication session while the main communication session is still ongoing. This permits communication sessions to be hierarchical and include sub sessions. It is noted that each sub session can itself become its own main session from which another hierarchy can be derived and another set of sub sessions established.

In an embodiment, at 121, the collaboration service detects the selected element when a party in the communication session performs an operation on the element. So, a party (such as a user) may be using a GUI editor for the communication session and highlight or select the element and then use a dropdown menu to perform an operation.

Continuing with the embodiment at 121 and at 122, the collaboration service recognizes the element as a chat message, an online interactive whiteboard, or a document.

In another situation of 122 and at 123, the collaboration service identifies the operation as: a reply to a chat message when the element is the chat message, a lock request when the element is the online whiteboard, and/or a comment, modification or a tag insertion when the element is a portion of the document.

At 130, the collaboration service generates a sub communication session that begins with the selected element and is maintained independent of the communication session. The sub communication session is linked back to the communication session. Essentially, the sub communication session is forked off as an independent sub session from the main communication session. It has a relationship back to the main communication session and yet it is its own independent session that is initiated.

According to an embodiment, at 131, the collaboration service produces a unique address for the element that permits the element to be referenced and accessed via the address: over the Internet, outside and independent of the communication session, and outside and independent of the sub communication session.

For example, the element may acquire an address that includes a top-level identifier for the main communication session and a serial number that uniquely identifies the selected element. In some cases, the serial number may also have appended to it a version number for the element. This address can be accessed outside the communication session and the sub communication session. It is noted that such is not the case with existing technologies where typically just an address to the session is made available and not addresses to sub component elements of the session.

Figure 2:
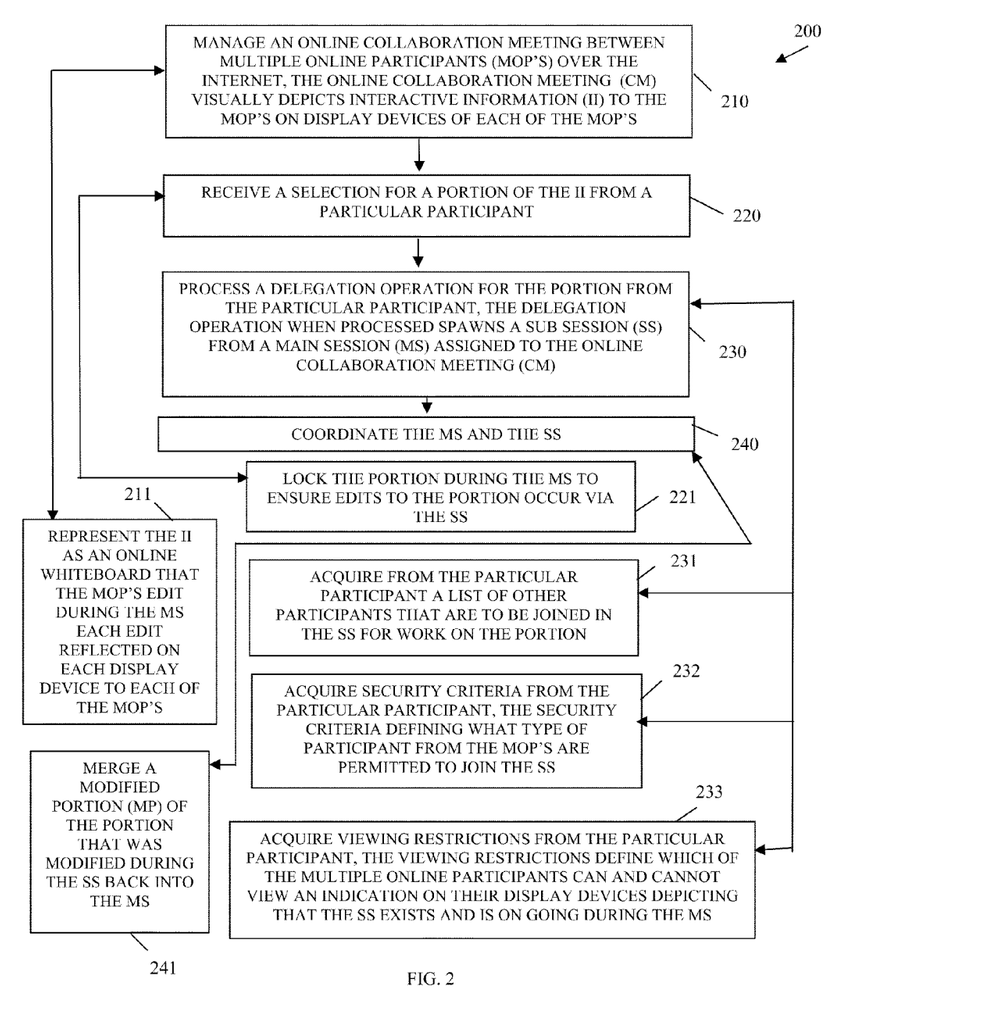
FIG. 2 is a diagram of another method for dynamic online collaboration, according to an example embodiment.

FIG. 2 is a diagram of another method 200 for dynamic online collaboration, according to an example embodiment. The method 200 (hereinafter "session manager" is implemented in a machine-accessible and computer-readable storage medium as instructions. The instructions reside in a machine and are executed by the machine (one or more processors) to perform the processing depicted in the FIG. 2. Moreover, the session manager is operational over a network, and the network may be wired, wireless, or a combination of wired and wireless.

The session manager provides another and in some cases enhanced perspective to the collaboration service represented by the method 100 of the FIG. 1. In fact, the session manager provides a specific embodiment and usage of the collaboration service along with enhanced and different features from that which was discussed above with respect to the method 100 of the FIG. 1.

At 210, the session manager manages an online collaboration meeting occurring between multiple online participants (such as users). The online collaboration meeting occurs over the Internet and visually depicts interactive information to each of the multiple online participants on display devices of each participant.

At 211, the session manager represents the interactive information as an online whiteboard that multiple online participants edit during the main session, each edit reflected on each display device to each of the multiple online participants.

At 220, the session manager receives a selection for a portion of the interactive information from a particular participant. The interactive information can be electronic objects that represent data structures, such as graphical objects (text, boxes, tables, flow charts, etc.) that can be manipulated by the participants via selection devices on their displays.

In a particular scenario, at 221, the session manager locks a portion of the interactive information that was selected during the main session. This may be done to ensure edits to the portion selected can be made without conflict in the sub session (discussed below with reference to the processing at 230). In an embodiment, the portion may be a row or column of a single table being presented in the main session. The row or column or entire table can be locked for manipulation during the sub session. It is noted that locks do not have to occur in each instances as it may be desirable to permit concurrent changes to the selected portion of interactive information, which take place in the main session and concurrently in the sub session.

At 230, the session manager processes a delegation operation for a selection made to a portion of the interactive information by a particular participant in the main session. The delegation operation, when processed, spawns or forks a sub communication session off the main communication session during the online collaboration meeting. So, two sessions are concurrently processing in parallel during the online collaboration meeting: the main session and the newly delegated sub session. The sub session was initiated in response to a selection of a portion of the interactive information by the particular participant and the instruction to process a delegation operation.

According to an embodiment, at 231, the session manager acquires from the particular participant a list of other participants that are to be joined in the sub session for work on the portion of interactive information. In other words, the particular participant that causes the sub session to be initiated can identify other participants that are permitted to join in the sub session. Policy may drive whether these participants are automatically and dynamically joined in the sub session or whether each of these other participants are required to actively request entry into the concurrent sub session that is transpiring.

In another case, at 232, the session manager acquires security criteria from the particular participant. The security criteria define what type of participant from the multiple online participants of the main session that are permitted to join in on the sub session. So, unlike the embodiment at 231 where specific identities of participants are provided via a list, the embodiment at 232 permits the creating participant of the sub session to generically define the security conditions that allow entry into sub session.

In still another variation, at 233, the session manager acquires viewing restrictions from the particular creating participant of the sub session. The viewing restrictions define which of the multiple online participants from the main session can and cannot view an indication on their own display devices depicting whether the sub session even exists and is actively going on or taking place during the main session. That is, security may keep the very existence of the sub session hidden from the view of some participants in the main session. Conversely, others with proper security clearance or credentials may see on their display devices a visual indication that a sub session is taking place (from the main session) and may even be able to acquire some metadata about the sub session, such has which participants are in the sub session, when it started, who started it, the topic for which the sub session is related, the portion of selected interactive information being acted upon in the sub session, etc.

At 240, the session manager dynamically and in real time coordinates the main session and the sub session with one another. So, even though the sub session is entirely independent of the main session, the main session and the sub session are still linked together and may even be subsequently synchronized. Thus, each session includes relationships to other sessions and to other resources or elements associated with the online collaboration meeting.

According to an embodiment, at 241, the session manager merges a modified portion of the selected portion of interactive information back into the main session. That is, in this embodiment, the selected portion of interactive information is modified in the sub session and the session manager integrates the modified portion back into the main session. The processing associated with integration can occur in a variety of manners. For example, the main session (via a participant with proper credentials) can request the update; alternatively, the sub session can request that the main session be updated (via policy, event, or direction of a sub session participant).

Figure 3:
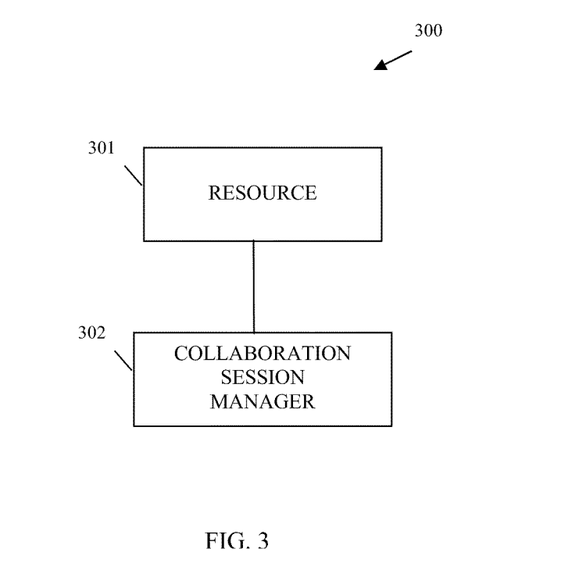
FIG. 3 is a diagram of a dynamic online collaboration system, according to an example embodiment.

FIG. 3 is a diagram of a dynamic online collaboration system 300, according to an example embodiment. The dynamic online collaboration system 300 is implemented in a machine-accessible and computer-readable storage medium as instructions. The instructions are executed by one or more processors to perform the processing depicted in the FIGS. 1 and 2. Moreover, the dynamic online collaboration system 300 is operational over a network, and the network may be wired, wireless, or a combination of wired and wireless.

It is again noted that the components and processing depicted the dynamic online collaboration system 300 reside and are executed on one or more processors that comprise a machine.

The dynamic online collaboration system 300 includes a resource 301 and a collaboration session manager 302. Each of these and their interactions with one another will now be discussed in turn.

The resource 301 resides and is represented in a computer-readable storage medium. The resource 301 is accessed by one or more processors from within the computer-readable storage medium and manipulated in the manners discussed herein above and below. Example aspects associated with the resource 301 was presented above with reference to the methods 100 (element references) and 200 (interactive information references) of the FIGS. 1 and 2, respectively.

During operation of the dynamic online collaboration system 300, the resource 301 is to be selected by a participant. So, during an existing and established main communication session, a participant selects the resource 301 via a selection device for manipulation; this in turn drives processing associated with the collaboration session manager 302.

According to an embodiment, the resource 301 is a chat message, a portion of a document (paragraph, table, page, etc.), a portion (interactive object) of an online whiteboard, a grouping of chat messages, a grouping of portions of a document, a grouping of portions (interactive objects) of an online whiteboard, and/or etc.

In a particular situation, the resource 301 is a chat message. The chat message occurs in a middle of a chat dialogue, which is the main communication session. By middle it is meant that the most recent or last chat message is not the chat message, which is the resource 301; rather, the resource 301 is some non linear selection of the chat messages that is other than the most recent or last chat message in the dialogue associated with the main communication session.

In another embodiment, the resource 301 is a component of a hierarchy assigned to and representing the main communication session. Additionally, the resource 301 concurrently belongs to another and entirely different hierarchy associated with the sub session. So, in a scenario where the resource 301 is an interactive portion of an online whiteboard, the resource 301 may be situated on the online whiteboard within a particular hierarchy defining work to be done for an enterprise on a particular enterprise problem. When the resource 301 is selected and becomes the centerpiece of the sub session, that sub session can have another different hierarchy to which the resource 301 is assigned.

In yet another case, the resource 301 is assigned an externally accessible and unique address by the session manager to make the resource 301 accessible outside both the main communication session and the sub session via that resource's 301 unique address. An example format for such an address was supplied above with reference to the method 100 of the FIG. 1.

The collaboration session manager 302 is implemented in a computer-readable storage medium and is executed by one or more processors. Example processing and feature/function associated with the collaboration session manager 302 were presented in detail above with reference to the methods 100 and 200 of the FIGS. 1 and 2, respectively.

The collaboration session manager 302, in response to a participant taking action on the resource 301 and selecting the resource 301 during the main communication session, starts or generates a sub session that is independent of the main session and yet still related to and linked back to the main session.

Again, it is to be noted that the main session and the sub session s are collaboration sessions having the participant and multiple other participants (one or more and in some cases two or more other participants) that are interacting in real time and dynamically with one another over a network, such as the Internet, via the one or more processors.

According to an embodiment, the collaboration session manager 302 re-integrates and updates a modified version of the resource 301 back into the main communication session from the sub session in response to an event or a policy evaluation. So, the resource 301 can be merged back into the main session from the sub session based on some event or policy evaluation. This occurs in a dynamic and automated fashion via the collaboration session manager 302.

Figure 4:
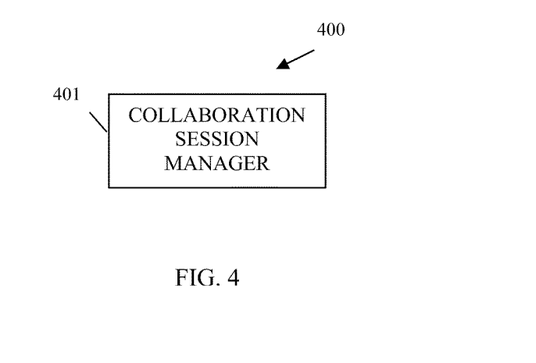
FIG. 4 is a diagram of another dynamic online collaboration system, according to an example embodiment.

FIG. 4 is a diagram of another dynamic online collaboration system 400 according to an example embodiment. The dynamic online collaboration system 400 is implemented as instructions on or within a machine-accessible and computer-readable storage medium. The instructions are executed by one or more machines (computer(s), processors, or processor-enabled device(s)) and perform various aspects of the processing depicted with respect to the methods 100 and 200 of the FIGS. 1 and 2, respectively; and the system 300 of the FIG. 3. The dynamic online collaboration system 400 is also operational over a network and the network may be wired, wireless, or a combination of wired and wireless.

The dynamic online collaboration system 400 includes a collaboration session manager 401.

The collaboration session manager 401 is implemented in a computer-readable storage medium as instructions that are executed on one or more processors over the network. Example aspects of the collaboration session manager 401 were presented above in detail with reference to the methods 100 and 200 of the FIGS. 1 and 2, respectively, and with respect to the system 300 of the FIG. 3 (particularly with respect to the discussion of reference numeral 302).

The collaboration session manager 401 is to fork off one or more sub communication sessions from a main communication session in a non-linear and non-sequential manner. In other words, the main communication session is time-based and is occurring in a sequential time-ordered manner and the sub session is specifically created or forked off independent of that ordering in a non-linear manner.

The collaboration session manager 401 coordinates the main communication session and the one or more sub communication sessions. Furthermore, the collaboration session manager 401 permits the sub communication sessions to proceed in a manner that is independent of each other and independent of the main communication session until each sub communication session is subsequently re-integrated with one another and back into the main communication session.

In an embodiment there is just a single sub communication session. In another embodiment, there are two or more sub communication sessions that are forked off from the main communication session. In some embodiments, the number of sub communication sessions that may be permissibly allowed is controlled by a policy evaluation dynamically made by or a configuration parameter supplied to the collaboration session manager 401.

According to one processing scenario, the collaboration session manager 401 hides an existence of the one or more sub communication sessions from viewing by selective participants in the main communication session. This is based on policy evaluation and/or enforcement of security restrictions, which are processed by the collaboration session manager 401 in a dynamic and real time fashion.

In another case, the collaboration session manager 401 enforces entry restrictions on participants that attempt to participate in the one or more sub communication sessions. Details of such cases were described above with reference to the method 200 of the FIG. 2.

Continuing with the previous embodiment and in a new situation, the entry restrictions are provided dynamically by creating participants that initially create or cause to be created the one or more sub communication sessions.

In still another modification, the entry restrictions are represented as attributes, which are acquired as metadata by the collaboration session manager 401 with the resource when the one or more sub communication sessions are forked off the main communication session.

So, the entry restrictions can be dynamically supplied via creating participants in a real time fashion or alternatively the entry restrictions can be acquired as metadata attributes carried with the resources themselves. In still another case, the entry restrictions are dynamically acquired via an identity service or authentication service when the sub sessions are created based on the identity of the resources to which the sub sessions relate, the identity of main session, and/or the identity of the creating participants (participants that create or cause to be created the sub sessions).

In some implementations of the above-noted invention, the main session and sub session can be represented and depicted to participants as a graph that displays relationships between session and even within sessions for the resources and the sessions. It is also noted that groupings of resources can be logically combined to form a virtual resource for which a sub session can be created and managed off a main session.

FIGS. 5-11 are now presented for further illustration of the dynamic collaboration techniques and systems presented herein and above. Again, the techniques and architecture arrangement presented in FIGS. 5-11 are presented for purposes of illustration only and are sample embodiments of the invention. Additionally, these techniques are implemented in computer-readable storage media as instructions that are executed on physical machines, such as one or more processors and the techniques are operational over communication networks that are wired, wireless, or a combination of wired and wireless.

Figure 5:
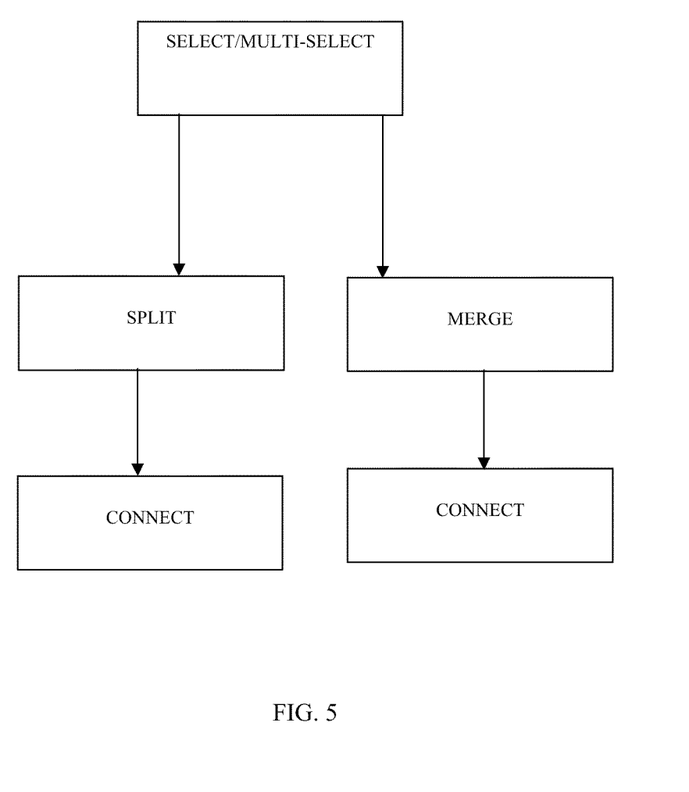
FIG. 5 is a diagram of an example element interaction for an online collaboration system, according to an example embodiment.

FIG. 5 is a diagram of an example element interaction for an online collaboration system, according to an example embodiment.

Once selected and operated upon, the element/elements are automatically split or merged into a distinct element, and the relationships established with the other elements in the content, so that the content is still accessible.

Figure 6:
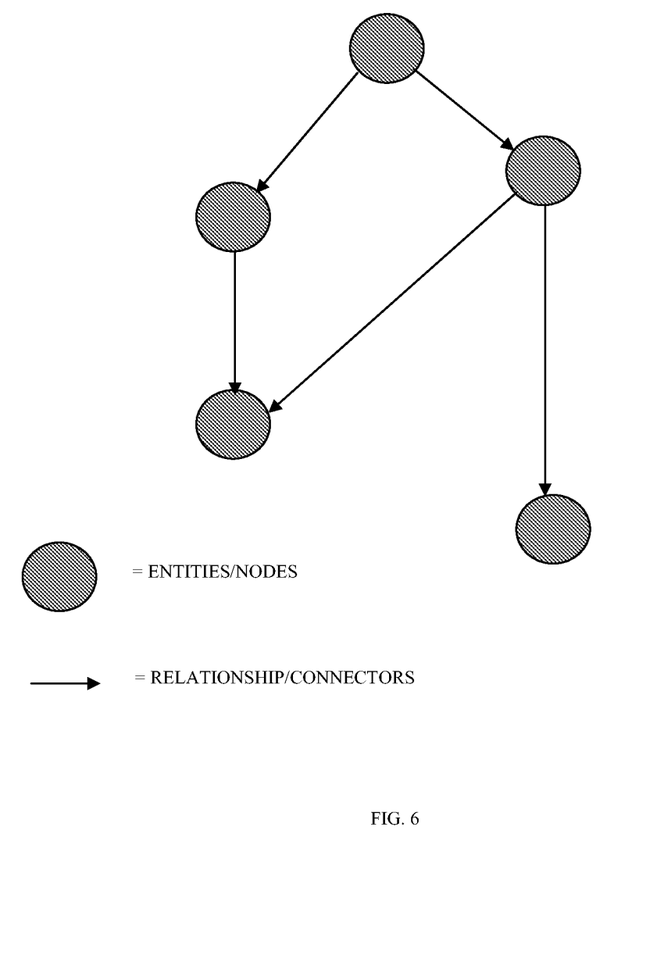
FIG. 6 is a diagram depicting a collaboration element or item represented as a connected tree or graph, according to an example embodiment.

FIG. 6 is a diagram depicting a collaboration element or item represented as a connected tree or graph, according to an example embodiment.

Each of these relationships is expressed in a form of connections (arrows in FIG. 6) between entities or nodes (circles in FIG. 6) in the dynamic collaboration system. Directional connectors are used to express the relationships.

Once split each of these elements and connectors are uniquely addressable from outside the system (externally addressable).

Figure 7:
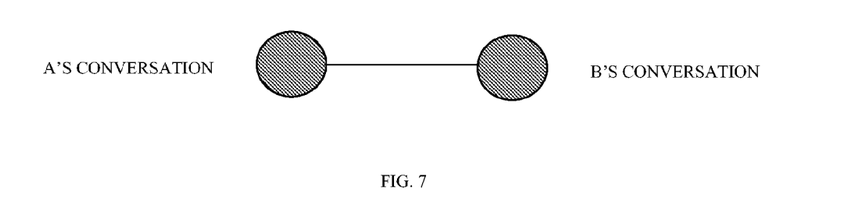
FIG. 7 is a diagram depicting a chat session representation before a non-linear reply.

FIG. 7 is a diagram depicting a chat session representation before a non-linear reply. In FIG. 7 there are initially two parties that are chatting with one another in a non-linear fashion.

Figure 8:
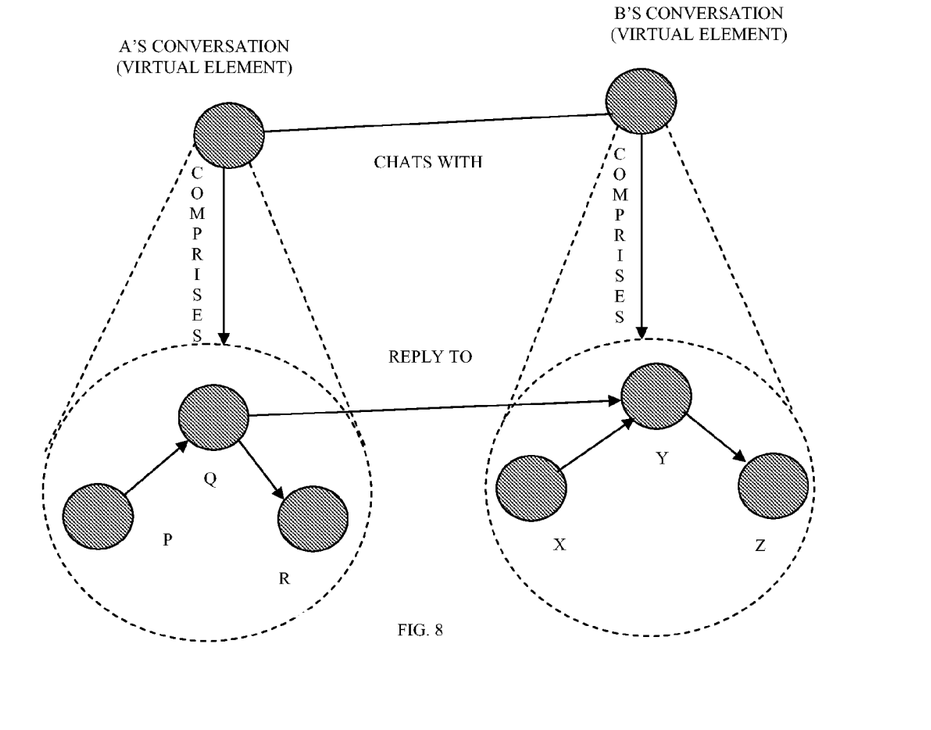
FIG. 8 is a diagram depicting a chat session after a non-liner reply.

FIG. 8 is a diagram depicting a chat session after a non-liner reply. In FIG. 8 there is a non-linear reply that has taken place and the concept of a virtual element is introduced.

Virtual elements are made by virtual groupings or virtual splits, and are used to interpose different hierarchies on the collaboration content, without actually changing the basic hierarchy and structure of the collaboration. These include references to existing elements, having a different set of connector relationships.

For example, when a chat message is being replied to it is split and becomes its own element, connected from its previous message and next message, and also connected to its reply. All these elements are also part of a bigger element which is virtual in nature, and which represents the entire conversation.

In one case, each element is externally addressable as a Hypertext Markup Language (HTML) Uniform Resource Locator (URL) or Uniform Resource Identifier (URI) link with the following components in its URL/URI component:
  Top-level Collaboration Item (file, whiteboard name, chat session name etc.)
  Element-Serial-Number (non-monotonically increasing)
  Version (of this element)

For example, consider a chat session where the chat participants can respond to any message element in a non-linear fashion. That proceeds as follows.

Step 1. The chat session is organized as two elements A and B, and is connected by the relationship chats-with (A, B). (A and B are element nodes and "chats-with" is the relationship connector.) Each node has the contents of all the messages sent by the particular participant A or B.

Step 2. Suppose B selects message m of A's conversation and replies to it with message n.

Step 3. Element A is now broken into 3 nodes—P, Q and R with the relationships, Next (P, Q), Next (Q, R). P, Q, and R are assigned externally addressable URL's/URI's based on the addressing scheme mentioned above. The contents of A are broken at m, and the contents before m are written to P, the contents after m are written to R, and the contents of message m are written to node Q.

Step 4. Similarly, B is now broken into 3 nodes—X, Y, Z with the relationships, Next (X, y), Next (y, Z). An additional relationship is added between Q and Y, reply-to (Q, Y). Z, Y, Z are assigned externally addressable URL's/URI's based on the addressing scheme mentioned above, and contents are split similar to the previous step.

Step 5. Contents are removed from A and B, and they are flagged as virtual nodes, and the containment relationships comprises (A, P, Q, R) and comprises (B, X, Y, Z) are setup.

Thus a graph or a tree (based on the constraints imposed by the system) is formed.

It is noted that each session can break off with other parties to establish their own hierarchical relationships and sub communication sessions. So, nesting and multiple communication session levels can occur.

Figure 9:
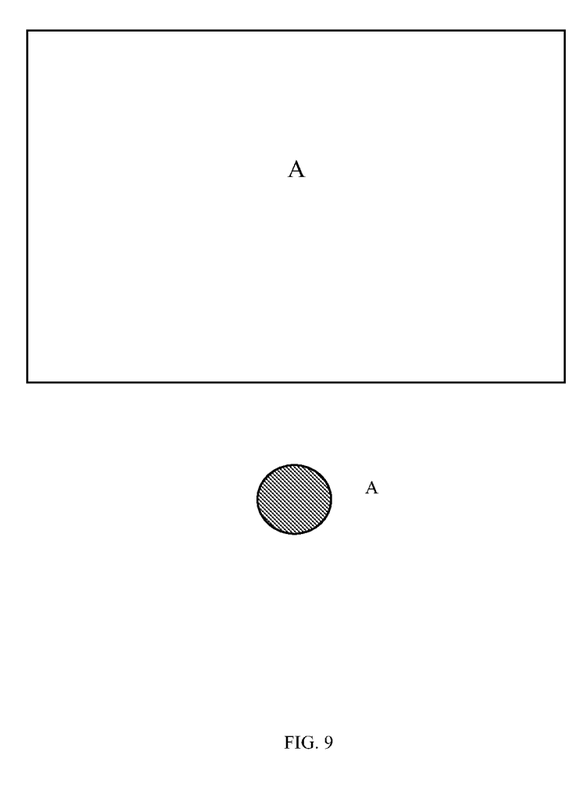
FIG. 9 is a diagram visually depicting an online whiteboard arrangement having an area identified as "A."
Figure 10:
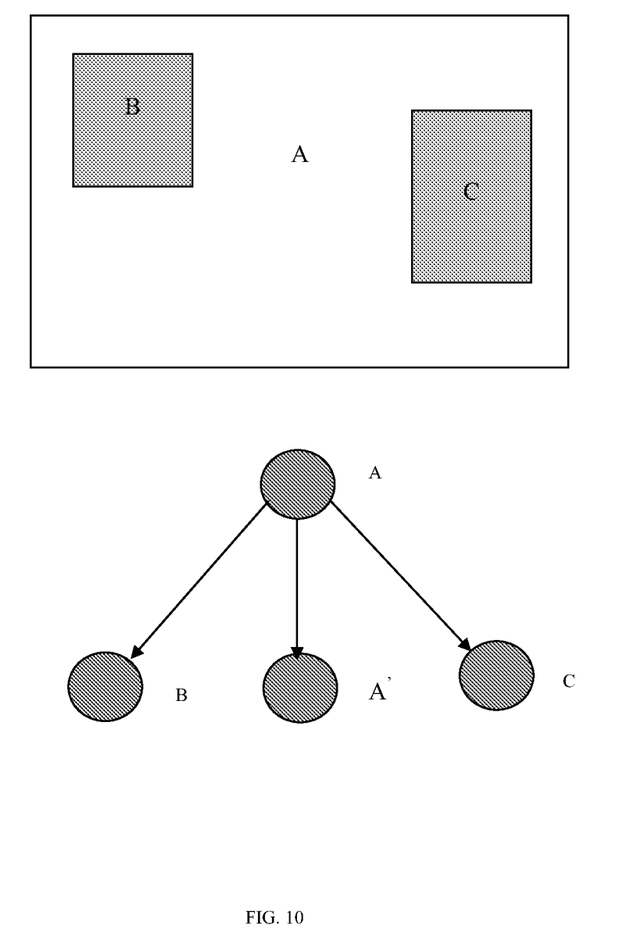
FIG. 10 is a diagram visually depicting the online whiteboard of FIG. 9 where new areas "B" and "C" are established.
Figure 11:
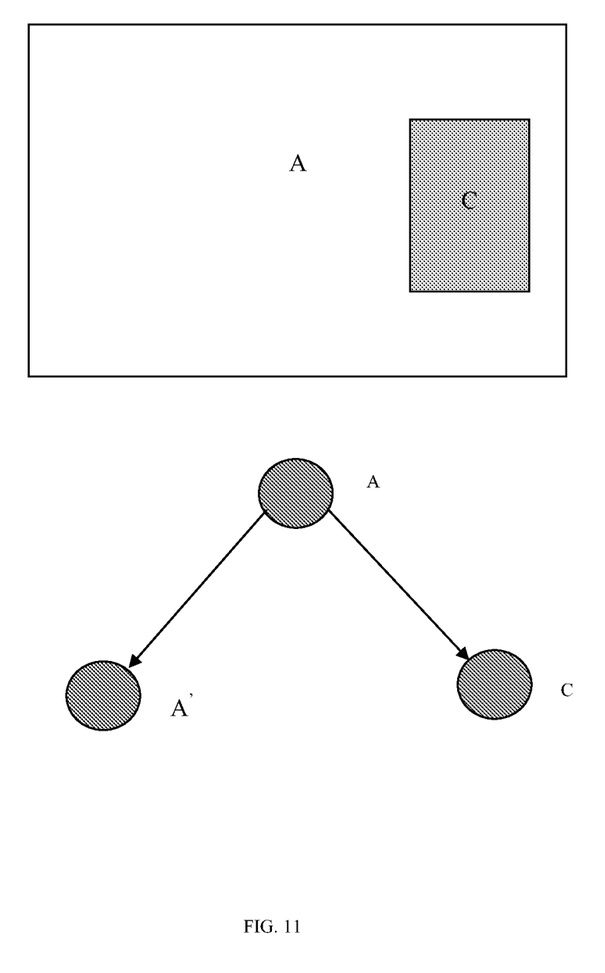
FIG. 11 is a diagram visually depicting the online whiteboard of FIG. 10 after a deletion of area "B."

FIGS. 9-11 now more fully illustrate usages of the techniques presented herein with respect to an online whiteboard type of dynamic collaboration.

FIG. 9 is a diagram visually depicting an online whiteboard arrangement having an area identified as "A." FIG. 10 is a diagram visually depicting the online whiteboard of FIG. 9 where new areas "B" and "C" are established. FIG. 11 is a diagram visually depicting the online whiteboard of FIG. 10 after a deletion of area "B." All three FIGS. 9-11 are now discussed together within the context of some sample interactions as depicted in the three FIGS.

Step 1. The contents of the white-board are stored in a single node to begin with, node "A," as shown in FIG. 9.

Step 2. User x selects the rectangle marked by B, and selects an edit operation on it, now B is allotted to use x, and he/she begins to edit the contents. The contents of the whiteboard A are now split into B and A' and both are connected from A (FIG. 10). The contents of the rectangle chosen by x are stored at node B, the rest of the contents of A are stored at A'.

Step 3. Similarly, user y selects the rectangle marked by C (also FIG. 10).

Step 4. User x finishes editing the rectangle marked by B, and saves and releases the area on which the contents of A' and B are merged into A'. Now the new tree appears as shown in FIG. 11.

Note that because of the external addressability of the elements, the contents and the nodes can even be shared or moved to another physical node, which means that B and C could even be located at multiple locations.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A processor-implemented method implemented as instructions residing in a non-transitory machine-readable storage medium and to execute on a processor, the method, comprising:
   maintaining, by the processor, a communication session occurring in a time-based and sequential order;
   identifying, by the processor, a selection of an element within the communication session, the selected element occurring before a most recent element for the communication session provided in the sequential order and the selection made in a non-linear fashion within the communication session; and
   generating, by the processor, a sub communication session that begins with the selected element and is maintained independent of the communication session, the sub communication session linked back to the communication session, the selected element identified by a unique address for the selected element that includes a top-level identifier for the communication session, a serial number for the selected element, and a version number for the selected element, the unique address represented as a uniform resource locator or uniform resource identifier link and the unique address accessible outside the communication session and the sub communication session, and
   the selected element representing a new communication session maintained while the communication session is ongoing, the selected element becoming its own main session from which another set of sub-sessions are established from, and
   the sub communication session eventually requests that the communication session be updated based on direction of a particular sub session participant, and the sub communication session is itself a set of hierarchical communication sessions.

2. The method of claim 1, wherein maintaining further includes managing the communication session as one of the following: an online chat session, an interactive online meeting session with multiple parties, and an interactive editing session for editing a document with the multiple parties performing edits to the document.

3. The method of claim 1, wherein maintaining further includes providing a visual depiction of the communication session and management operations for the communication session via a Graphical User Interface (GUI).

4. The method of claim 1, wherein identifying further includes detecting the selected element when a party in the communication session performs an operation on the element.

5. The method of claim 1, wherein detecting further includes recognizing the selected element as one of the following: a chat message, an online whiteboard, and a document.

6. The method of claim 5, wherein recognizing further includes identifying the operation as: a reply to the chat message when the element is the chat message; a lock request when the element is the online whiteboard; and a comment, a modification, or a tag insertion when the element is a portion of the document.

7. A machine-implemented system, comprising:
   one or more processors,
   a resource residing in a non-transitory computer-readable storage medium and
   accessed by one or more processors on the non-transitory computer-readable storage medium; and
   a collaboration session manager implemented in a non-transitory computer-readable storage medium and executed by the one or more processors;
   wherein the resource is to be selected during a collaboration session by a participant, and the resource accessible via a unique address that is accessible outside of a and independent of the collaboration session, and
   wherein the resource is one of: a chat message, a portion of a document, a portion of an online whiteboard, and a grouping of chat messages, and
   wherein the collaboration session manager, in response to an action taken by the participant on the selected resource during a main communication session, starts a sub session independent of but still linked to the main communication session, the sub session is a nonlinear portion of the main session and the sub session represents a new communication session maintained while the main session is ongoing, the sub session becoming its own main session from which another set of sub-sessions are established from, and
   wherein the main communication session and the sub session are collaboration sessions having the participant and multiple other participants interacting via the one or more processors over a network and the sub session is processed concurrently and in parallel with the main communication session and uses a different hierarchy from that which is associated with the main communication session, and
   the main communication session subsequently updated based on a request made by the sub session from evaluation of a particular policy and the sub session is itself a set of hierarchical communication sessions.

8. The system of claim 7, wherein the resource is the chat message and the chat message occurs in a middle of a chat dialogue associated with the main communication session.

9. The system of claim 7, wherein the resource is a component of a hierarchy associated with the main communication session and also concurrently is a part of another hierarchy associated with the sub session.

10. The system of claim 7, wherein the session manager re-integrates and updates a modified version of the resource back into the main communication session from the sub session in response to an event or a policy.

* * * * *

UNITED STATES PATENT AND TRADEMARK OFFICE
CERTIFICATE OF CORRECTION

PATENT NO. : 8,812,961 B2
APPLICATION NO. : 12/472537
DATED : August 19, 2014
INVENTOR(S) : Srinivasaraghavan et al.

Page 1 of 1

It is certified that error appears in the above-identified patent and that said Letters Patent is hereby corrected as shown below:

In the Claims,

In column 12, line 15, in Claim 7, after "medium", delete "¶", therefor

In column 12, line 24, in Claim 7, after "of", delete "a", therefor

Signed and Sealed this
Eleventh Day of November, 2014

Michelle K. Lee
*Deputy Director of the United States Patent and Trademark Office*